United States Patent
Honishi et al.

(10) Patent No.: US 8,347,323 B2
(45) Date of Patent: Jan. 1, 2013

(54) METHOD AND APPARATUS FOR SUPPORTING DEVELOPMENT OF BROKER PROGRAM, AND COMPUTER PRODUCT

(75) Inventors: Yoshitaka Honishi, Kawasaki (JP);
Tokio Nakayama, Toyama (JP);
Yoshiharu Kamata, Kawasaki (JP);
Shinya Suematsu, Kawasaki (JP);
Kouichi Hidaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1281 days.

(21) Appl. No.: 11/438,871

(22) Filed: May 23, 2006

(65) Prior Publication Data
US 2007/0209044 A1   Sep. 6, 2007

(30) Foreign Application Priority Data
Feb. 22, 2006   (JP) .................. 2006-045610

(51) Int. Cl.
*G06F 9/44* (2006.01)

(52) U.S. Cl. ........ 719/330; 719/313; 719/328; 719/331; 709/200; 709/201; 709/217; 709/223; 709/246; 717/108; 717/116; 717/171; 726/1

(58) Field of Classification Search .................. 719/310, 719/313–316, 318, 320, 328, 330; 709/200, 709/201–203, 217, 223–230, 246, 250; 707/10, 707/103 R–104.1; 717/108, 116, 171; 726/1
See application file for complete search history.

(56) References Cited

U.S. PATENT DOCUMENTS

| | | | |
|---|---|---|---|
| 5,913,061 A | | 6/1999 | Gupta et al. |
| 6,032,198 A * | | 2/2000 | Fujii et al. .................. 719/328 |
| 6,049,819 A * | | 4/2000 | Buckle et al. .................. 709/202 |
| 6,336,118 B1 * | | 1/2002 | Hammond .................. 1/1 |
| 6,343,332 B1 * | | 1/2002 | Ueda .................. 719/320 |
| 6,385,769 B1 * | | 5/2002 | Lewallen .................. 717/125 |
| 6,609,158 B1 * | | 8/2003 | Nevarez et al. .................. 719/316 |
| 6,728,788 B1 * | | 4/2004 | Ainsworth et al. .................. 719/330 |
| 6,775,680 B2 * | | 8/2004 | Ehrman et al. .................. 1/1 |
| 6,792,611 B2 * | | 9/2004 | Honishi et al. .................. 719/328 |
| 7,100,153 B1 * | | 8/2006 | Ringseth et al. .................. 717/140 |
| 7,150,010 B1 * | | 12/2006 | Ringseth et al. .................. 717/140 |
| 7,707,594 B1 * | | 4/2010 | Foster et al. .................. 719/330 |
| 2002/0023261 A1 * | | 2/2002 | Goodwin et al. .................. 717/146 |

(Continued)

FOREIGN PATENT DOCUMENTS
JP   10-260825   9/1998
(Continued)

OTHER PUBLICATIONS

"Japanese Office Action" mailed by JPO and corresponding to Japanese application No. 2006-045610 on May 8, 2012, with English translation.

Primary Examiner — Andy Ho
Assistant Examiner — Shih-Wei Kraft
(74) Attorney, Agent, or Firm — Fujitsu Patent Center

(57) ABSTRACT

A broker-program generating unit generates a broker program by using an interface-definition-language file defining interface definition information concerning a plurality of applications described in various programming languages. The broker program is installed in a middleware platform that absorbs and hides a common object request broker architecture, and brokers an interaction between the applications with a structure that stores data in a binary format as an interface to the middleware platform.

3 Claims, 24 Drawing Sheets

U.S. PATENT DOCUMENTS

| | | | |
|---|---|---|---|
| 2002/0099738 A1* | 7/2002 | Grant | 707/513 |
| 2002/0194391 A1* | 12/2002 | Yamamoto | 709/316 |
| 2003/0093551 A1* | 5/2003 | Taylor et al. | 709/237 |
| 2003/0177170 A1* | 9/2003 | Glass | 709/203 |
| 2004/0015898 A1* | 1/2004 | Tewksbary | 717/140 |
| 2004/0221017 A1* | 11/2004 | Yoon | 709/217 |
| 2005/0071852 A1* | 3/2005 | Yoon | 719/328 |

FOREIGN PATENT DOCUMENTS

| | | |
|---|---|---|
| JP | 11-296359 | 10/1999 |
| JP | 2002-342078 | 11/2002 |
| JP | 2003-157242 | 5/2003 |

* cited by examiner

FIG.3

```
module apfw_mod{
        interface apfw_inf{
                void        op( in long indata );
        };
};
```

FIG.4

```
typedef struct sample_str1{
    string<10>     sample_picx;
    wstring<10>    sample_picn;
    string<6>      sample_pic9;
    string<10>     sample_occurs[5];
} sample_struct1;
module apfwmod
{
   interface apfwinf
   {
      void sampleop1( in sample_struct1 indata, out sample_struct1 outdata );
   };
};
```

FIG.5

```
<?xml version="1.0" encoding="UTF-8"?>
<apfw-app>
    <server>
        <target name="apl" />
        <library name="libserverapl.so" />
        <map_check flag="ON" />
        <comment>../../comment/com.txt</comment>
        <userwork flag="OFF" />
        <pre flag="ON" />
        <post flag="ON" />
        <error flag="ON" />
    </server>

<client>
        <comment>../comment/com.txt</comment>
        <bean>
            <package>samplepkg</package>
        </bean>
    </client>
</apfw-app>
```

FIG.6

```c
#ifndef _SAMPLE1_H_
#define _SAMPLE1_H_

/* typedef */
#ifndef _sample_str1_sample_occurs_defined
#define _sample_str1_sample_occurs_defined
typedef char* sample_str1_sample_occurs[5];

endif /* _sample_str1_sample_occurs_defined */ ifndef _sample_str1_defined
define _sample_str1_defined
typedef struct sample_str1{
    char    * sample_picx;
    unsigned short   *sample_picn;
    char    *sample_pic9;
    sample_str1_sample_occurs   sample_occurs;
}sample_str1;

#endif /* _sample_str1_defined */
#ifndef _sample_struct1_defined
#define _sample_struct1_defined
typedef  sample_str1  sample_struct1;
#endif /* _sample_struct1_defined */

/* operation definitions */ ifndef _apfwmod_apfwintf_sampleop1_defined_
define _apfwmod_apfwintf_sampleop1_defined_
extern int
apfwskel_sampleop1(
    const char * const    _userwork,
    apfwCDR   *_cdr
);

extern void
sampleop1(
    sample_struct1 *,
    sample_struct1 **,
    int *,
    apfwExcept *
);
endif /* _apfwmod_apfwintf_sampleop1_defined_ */ endif /* _SAMPLE1_H_ */
```

FIG.7

```
#ifndef _SAMPLE1_CDR_H_
#define _SAMPLE1_CDR_H_

/* typedef */ static unsigned char
apfw_cdr_sample_str1_sample_occurs(
#ifdef __STDC__
    apfwCDR *,
    sample_str1_sample_occurs
#endif
);
static unsigned char
apfw_cdr_sample_str1(
#ifdef __STDC__
    apfwCDR *,
    sample_str1 *
#endif
);

define apfw_cdr_sample_struct1 apfw_cdr_sample_str1 endif /* _SAMPLE1_CDR_H_ */
```

FIG.8

```
#ifndef _SAMPLE1_CDR_C_
define _SAMPLE1_CDR_C_ include "apfwcom.h"
include "apfwcdr.h"
#include "sample1_apfw.h"
#include "sample1_apfwcdr.h"

/* typedef */ static unsigned char
ifdef __STDC__
apfw_cdr_sample_str1_sample_occurs( apfwCDR *cdrs, sample_str1_sample_occurs  p )
#else
apfw_cdr_sample_str1_sample_occurs( cdrs, p )
    apfwCDR   *cdrs;
    sample_str1_sample_occurs   p;
#endif /* __STDC__ */
{
    int   _array_dimension = 1;
    int   _array_elements_1 = 5;
    int   _lpcnt0 = 0;

if( apfw_cdr_long( cdrs, &_array_dimension ) == APFW_CDR_FALSE ){
        return APFW_CDR_FALSE;
    }
    if( apfw_cdr_long( cdrs, &_array_elements_1 ) == APFW_CDR_FALSE ){
        return APFW_CDR_FALSE;
    }
    for( _lpcnt0=0; _lpcnt0 < _array_elements_1; _lpcnt0++ ){
        if( apfw_cdr_long( cdrs, &p[_lpcnt0] ) == APFW_CDR_FALSE ){
            return APFW_CDR_FALSE;
        }
    }
    return APFW_CDR_TURE;
}
```

⋮

(CONTINUED TO NEXT PAGE)

FIG.9

```
(CONTINUED FROM PREVIOUS PAGE)
                           :
static unsigned char
ifdef __STDC__
apfw_cdr_sample_str1( apfwCDR *cdrs, sample_str1 *p )
#else
apfw_cdr_sample_str1( cdrs, p )
   apfwCDR   *cdrs;
   sample_str1   *p;
#endif /* __STDC__ */
{
   unsigned char  _flag = APFW_DATA_OFF;

if( apfw_cdr_octet( cdrs, &_flag ) == APFW_CDR_FALSE ){
      return APFW_CDR_FALSE;
   }
   if( _flag == APFW_DATA_ON ){
      if( apfw_cdr_string( cdrs, &p->sample_picx ) == APFW_CDR_FALSE ){
         return APFW_CDR_FALSE;
      }
   }
   if( apfw_cdr_octet( cdrs, &_flag ) == APFW_CDR_FALSE ){
      return APFW_CDR_FALSE;
   }
   if( _flag == APFW_DATA_ON ){
      if( apfw_cdr_wstring( cdrs, &p->sample_picn ) == APFW_CDR_FALSE ){
         return APFW_CDR_FALSE;
      }
   }
   if( apfw_cdr_octet( cdrs, &_flag ) == APFW_CDR_FALSE ){
      return APFW_CDR_FALSE;
   }
   if( _flag == APFW_DATA_ON ){
      if( apfw_cdr_string( cdrs, &p->sample_pic9 ) == APFW_CDR_FALSE ){
         return APFW_CDR_FALSE;
      }
   }
   if( apfw_cdr_octet( cdrs, &_flag ) == APFW_CDR_FALSE ){
      return APFW_CDR_FALSE;
   }
   if( _flag == APFW_DATA_ON ){
      if( apfw_cdr_sample_str1_sample_occurs( cdrs, &p->sample_occurs ) == APFW_CDR_FALSE ){
         return APFW_CDR_FALSE;
      }
   }
   return APFW_CDR_TRUE;
} endif /* _SAMPLE1_CDR_C_ */
```

FIG.10

```
#include "apfwcom.h"
include "apfwcdr.h"
#include "sample1_apfw.h"
#include "sample1_apfwcdr.h"

int
apfwskel_sampleop1(
    const char * const   _userwork,
    apfwCDR    *_cdr
)
{
    sample_struct1   *indata = NULL;
    sample_struct1   *outdata = NULL;

int                _transaction = APFW_RTN_ERROR;
    apfwExcept    _env;
    unsigned char    _flag = 0x00;
    unsgined char    _cdr_error = APFW_CDR_NO_ERROR;

unsigned char    _errflag = 0x00;
    memset( &_env, 0x00, sizeof(apfwExcept) );

apfw_cdr_initialize( _cdr, APFW_CDR_DECODE );
    if( _errflag == 0x00 ){
        if( apfw_cdr_octet( _cdr, &_flag ) == APFW_CDR_FALSE )
            _errlfag = 0x01;
        }
    }
    if( _errflag == 0x00 ){
        if( _flag != APFW_DATA_OFF ){
            indata = malloc(sizeof(sample_struct1));
            memset( &indata, 0x00, sizeof(sample_struct1) );
            apfw_cdr_sample_struct1( _cdr, indata );
        }
    }
              ⋮

(CONTINUED TO NEXT PAGE)
```

FIG.11

```
(CONTINUED FROM PREVIOUS PAGE)

:

if( _errflag != 0x00 ){
    if( indata != NULL ){
        free( indata );
    }
    return( _transaction );
} sampleop1(
    indata,
    &outdata,
    &_transaction,
    &_env );

if( _env.errcode != 0 ){
    apfw_cdr_initialize( _cdr, APFW_CDR_ENCODE );
    _flag = APFW_DATA_ON;
    apfw_cdr_octet( _cdr, &_flag );
    apfw_cdr_except( _cdr, &_env );
}else{
    apfw_cdr_initialize( _cdr, APFW_CDR_ENCODE );
    if( _errflag == 0x00 ){
        if( outdata == NULL ){
            _flag = APFW_DATA_OFF;
            apfw_cdr_octet( _cdr, &_flag );
        }else{
            _flag = APFW_DATA_ON;
            apfw_cdr_octet( _cdr, &_flag );
            apfw_cdr_sample_struct1( _cdr, outdata );
        }
    }
} if( indata != NULL ){
    free( indata );
}
if( outdata != NULL ){
    free( outdata );
} return( _transaction );
}
```

FIG.12

```xml
<?xml version="1.0" encoding="UTF-8"?>
<callHandler
    xmlns="http://interstage.fujitsu.com/schemas/apfw/callHandler"
    xmlns:xsi="http://www.w3.org/2001/XMLSchema-instance"
    xsi:schemaLocation="http://interstage.fujitsu.com/schemas/apfw/callHandler.xsd">
    <config>
        <version>1.0</version>
    </config>
    <target name="apl">
        <library name="libserverapl.so"/>
        <func name="op"/>
    </target>
</callHandler>
```

FIG.13

```xml
<?xml version="1.0" encoding="UTF-8"?>
<funcDef
    xmlns="http://interstage.fujitsu.com/schemas/apfw/funcDef"
    xmlns:xsi="http://www.w3.org/2001/XMLSchema-instance"
    xsi:schemaLocation="http://interstage.fujitsu.com/schemas/apfw/funcDef.xsd">
    <config>
        <version>1.0</version>
    </config>
    <func name="op">
        <interface>
            <return type="void"/>
            <params>
                <param name="indata" type="long" direction="IN"/>
            </params>
        </interface>
    </func>
</funcDef>
```

FIG.14

```
package sample1;

public class sampleop1Bean
    implements com.fujitsu.interstage.apfw.bean.ApfwBean
{
    private sample1.sample_str1 indata;
    private sample1.sample_str1 outdata;
    public sampleop1Bean() {}
    public void setIndata(sample1.sample_str1 indata)
    {
        this.indata = indata;
    }
    public sample1.sample_str1 getIndata()
    {
        return this.indata;
    }
    public void setOutdata(sample1.sample_str1 outdata)
    {
        this.outdata = outdata;
    }
    public sample1.sample_str1 getOutdata()
    {
        return this.outdata;
    }
}
```

FIG.15

```
package sample1;

public class sampleop1BeanCDR
    implements com.fujitsu.interstage.apfw.bean.ApfwBeanCDR
{
    private int ctc;
    private int wtc;
    private sample1.sampleop1Bean bean;
    private com.fujitsu.interstage.apfw.cdr.ApfwCDR cdr;
    public sampleop1BeanCDR() {}
    public void setCTC(int ctc)
    {
        this.ctc = ctc;
    }
    public void setWTC(int wtc)
    {
        this.wtc = wtc;
    }
    public byte[] getCommonData(com.fujitsu.interstage.apfw.bean.ApfwBean bean)
        throws com.fujitsu.interstage.apfw.cdr.ApfwDataConversionException
    {
        this.bean = (sample1.sampleop1Bean)bean;
        cdr = new com.fujitsu.interstage.apfw.cdr.ApfwCDR(null,1024,
            com.fujitsu.interstage.apfw.IApfwCDRConstants.ENCODE,
            com.fujitsu.interstage.apfw.IApfwCDRConstants.BIG_ENDIAN);
        cdr.setCTC(this.ctc);
        cdr.setWTC(this.wtc);
        byte[] _buf = null;
        if( this.bean.getIndata() != null )
        {
            cdr.setOctet(com.fujitsu.interstage.apfw.bean.ApfwBeanConstants.DATA_ON);
            sample1.sample_str1Helper.write(cdr,this.bean.getIndata());
        }
            else
        {
            cdr.setOctet(com.fujitsu.interstage.apfw.bean.ApfwBeanConstants.DATA_OFF);
        }
        _buf = cdr.getBuffer();
        cdr.destroyCDR();
        return _buf;
    }
    public com.fujitsu.interstage.apfw.bean.ApfwBean setCommonData(byte[] data)
        throws com.fujitsu.interstage.apfw.cdr.ApfwDataConversionException
    {
        this.bean = new sample1.sampleop1Bean();
        cdr = new com.fujitsu.interstage.apfw.cdr.ApfwCDR(data,0,
            com.fujitsu.interstage.apfw.IApfwCDRConstants.DECODE,
            com.fujitsu.interstage.apfw.IApfwCDRConstants.BIG_ENDIAN);
        cdr.setCTC(this.ctc);
        cdr.setWTC(this.wtc);
        if( cdr.getOctet() == com.fujitsu.interstage.apfw.bean.ApfwBeanConstants.DATA_ON )
        {
            this.bean.setOutdata(sample1.sample_str1Helper.read(cdr));
        }
        cdr.destroyCDR();
        return (com.fujitsu.interstage.apfw.bean.ApfwBean)this.bean;
    }
}
```

FIG.16

```
package sample1;

final public class sample_str1
{
    public java.lang.String sample_picx;
    public java.lang.String sample_picn;
    public java.lang.String sample_pic9;
    public java.lang.String[] sample_occurs;
    public sample_str1() {}
    public sample_str1(
          java.lang.String sample_picx,
          java.lang.String sample_picn,
          java.lang.String sample_pic9,
          java.lang.String[] sample_occurs) {
        this.sample_picx = sample_picx;
        this.sample_picn = sample_picn;
        this.sample_pic9 = sample_pic9;
        this.sample_occurs = sample_occurs;
    }
}
```

FIG.17

```java
package sample1;

abstract public class sample_str1Helper
{
    public static sample1.sample_str1
    read(com.fujitsu.interstage.apfw.cdr.ApfwCDR cdr)
        throws com.fujitsu.interstage.apfw.cdr.ApfwDataConversionException
    {
        sample1.sample_str1 _value = new sample1.sample_str1();
        if( cdr.getOctet() == com.fujitsu.interstage.apfw.bean.ApfwBeanConstants.DATA_ON )
        {
            _value.sample_picx = cdr.getString();
        }
        if( cdr.getOctet() == com.fujitsu.interstage.apfw.bean.ApfwBeanConstants.DATA_ON )
        {
            _value. sample_picn = cdr.getWString();
        }
        if( cdr.getOctet() == com.fujitsu.interstage.apfw.bean.ApfwBeanConstants.DATA_ON )
        {
            _value. sample_pic9 = cdr.getString();
        }
        if( cdr.getOctet() == com.fujitsu.interstage.apfw.bean.ApfwBeanConstants.DATA_ON )
        {
            _value.sample_occurs = sample_occursHelper.read(cdr);
        }
        return (_value);
    }
    public static void
    write(com.fujitsu.interstage.apfw.cdr.ApfwCDR cdr, sample1.sample_str1 _val)
        throws com.fujitsu.interstage.apfw.cdr.ApfwDataConversionException
    {
        if( _val.sample_picx != null )
        {
            cdr.setOctet(com.fujitsu.interstage.apfw.bean.ApfwBeanConstants.DATA_ON);
            cdr.setString(_val.sample_picx);
        }
        else
        {
            cdr.setOctet(com.fujitsu.interstage.apfw.bean.ApfwBeanConstants.DATA_OFF);
        }
        if( _val.sample_picn != null )
        {
            cdr.setOctet(com.fujitsu.interstage.apfw.bean.ApfwBeanConstants.DATA_ON);
            cdr.setWString(_val.sample_picn);
        }
        else
        {
            cdr.setOctet(com.fujitsu.interstage.apfw.bean.ApfwBeanConstants.DATA_OFF);
        }
        if( _val.sample_pic9 != null )
        {
            cdr.setOctet(com.fujitsu.interstage.apfw.bean.ApfwBeanConstants.DATA_ON);
            cdr.setString(_val.sample_pic9);
        }
        else
        {
            cdr.setOctet(com.fujitsu.interstage.apfw.bean.ApfwBeanConstants.DATA_OFF);
        }
        if( _val.sample_occurs != null )
        {
            cdr.setOctet(com.fujitsu.interstage.apfw.bean.ApfwBeanConstants.DATA_ON);
            sample_occursHelper.write(cdr, _val.sample_occurs);
        }
        else
        {
            cdr.setOctet(com.fujitsu.interstage.apfw.bean.ApfwBeanConstants.DATA_OFF);
        }
    }
}
```

FIG.18

```java
package sample1;

abstract public class sample_occursHelper
{
    public static java.lang.String[]
    read(com.fujitsu.interstage.apfw.cdr.ApfwCDR cdr)
        throws com.fujitsu.interstage.apfw.cdr.ApfwDataConversionException
    {
        java.lang.String[] _value = new java.lang.String[5];
        int _len = 0;
        _len = cdr.getLong();
        _len = cdr.getLong();
        for( int _i0 = 0; _i0 < _value.length; _i0++ )
        {
            if( cdr.getOctet() == com.fujitsu.interstage.apfw.bean.ApfwBeanConstants.DATA_ON )
            {
                _value[_i0] = cdr.getString();
            }
        }
        return (_value);
    }
    public static void
    write(com.fujitsu.interstage.apfw.cdr.ApfwCDR cdr, java.lang.String[] _val)
        throws com.fujitsu.interstage.apfw.cdr.ApfwDataConversionException
    {
        if( _val.length < 5 )
        {
            throw new com.fujitsu.interstage.apfw.cdr.ApfwDataConversionException();
        }
        cdr.setLong(1);
        cdr.setLong(5);
        for( int _i0 = 0; _i0 < 5; _i0++ )
        {
            if( _val[_i0] != null )
            {
                cdr.setOctet(com.fujitsu.interstage.apfw.bean.ApfwBeanConstants.DATA_ON);
                cdr.setString(_val[_i0]);
            }
            else
            {
                cdr.setOctet(com.fujitsu.interstage.apfw.bean.ApfwBeanConstants.DATA_OFF);
            }
        }
    }
}
```

FIG.24

| (1) INITIALIZATION OF ORB |
|---|
| ```
main ( argc, argv )              argc;
        int                      *argv[ ]
        char
{                                current_argc=argc;
int                              env;
CORBA_Environment                orb;
CORBA_ORB                        ORBid="ORB ID"
CORBA_string orb = CORBA_ORB_init(&current_argc, argv, ORBid, &env );
``` |

| (2) ACQUISITION OF OBJECT REFERENCE OF NAMING SERVICE |
|---|
| ```
CosNaming_Naming_NameContext     cos_naming
CORBA_Environment                env;
cos_naming=CORBA_ORB_resolve_initial_references(
orb,
CORBA_ORB_ObjectId_NameService,
&env);
``` |

| (3) ACQUISITION OF OBJECT REFERENCE OF SERVER APPLICATION |
|---|
| ```
CORBA_Environment                env;
CosNaming_Name                   name;
CORBA_object                     obj;
name._length=name._maximum=1
name._buffer=&name_component;
name_component.id="demo::calc":
name_component.kind=" "
obj=CosNaming_NamingContext_resolove(
        cos_naming,
        &name,
        &env);
``` |

| (4) CALLING OF OPERATION OF SERVER APPLICATION |
|---|
| ```
CORBA_long                       ret;
ret=demo_calc_add( obj, 2, 3, &env);
``` |

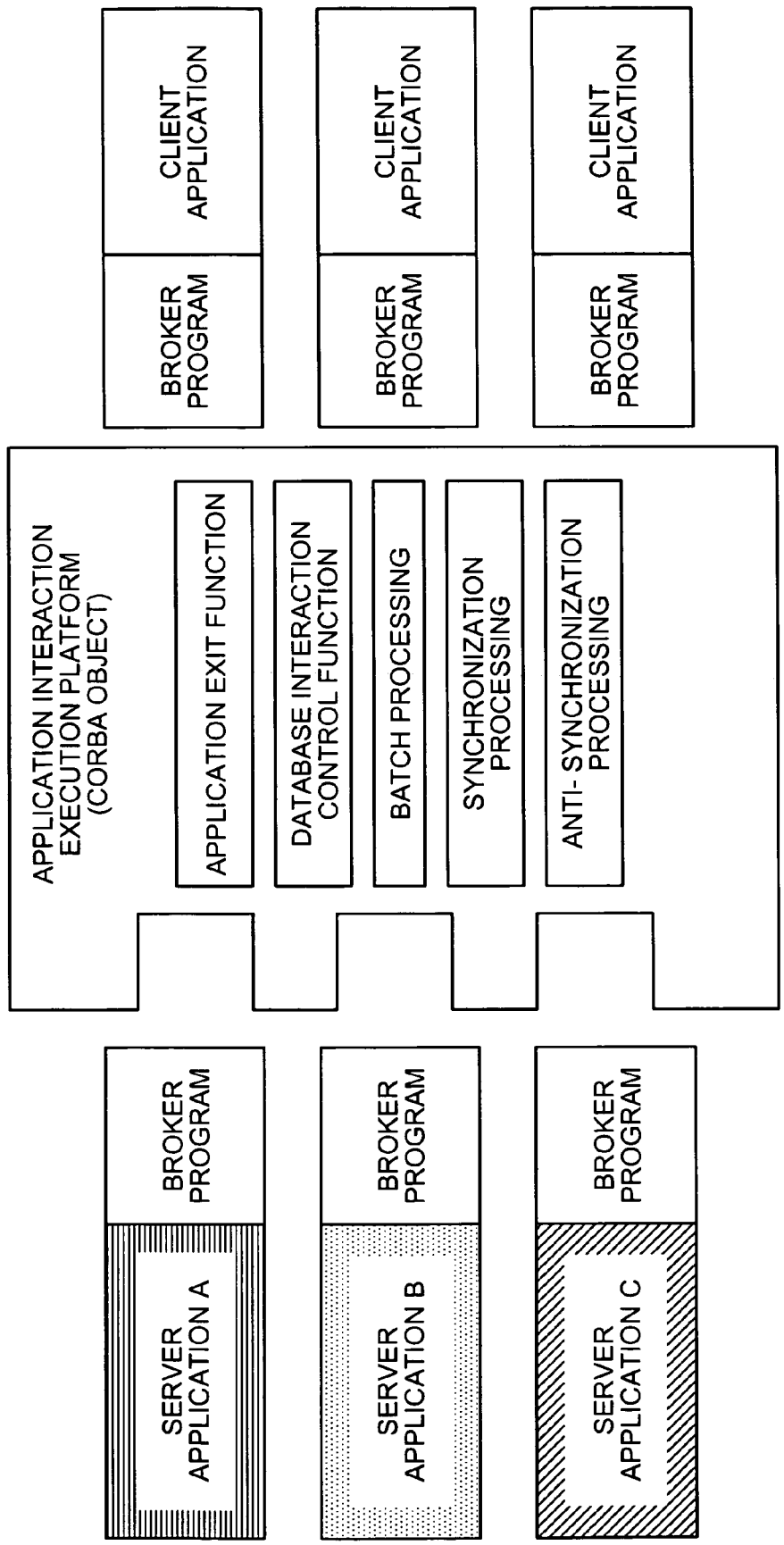

METHOD AND APPARATUS FOR SUPPORTING DEVELOPMENT OF BROKER PROGRAM, AND COMPUTER PRODUCT

BACKGROUND OF THE INVENTION

1. Field of the Invention

The present invention relates to a technology for supporting development of a broker program.

2. Description of the Related Art

Middleware platform technology, such as common object request broker architecture (CORBA), realizes interaction between applications described in various programming languages. A specification of the CORBA defines mechanisms for creating server applications and client applications, and operating the created applications. Thus, the server applications and the client applications need to be developed according to the specification.

FIG. 23 is a diagram for describing a method of developing applications according to CORBA. A developer designs a server application and a client application (see (1)). The developer describes interface definition information of the server application, to create an interface definition language (IDL) file (see (2)). The developer describes a source file for the server application and a source file for the client application (see (3)).

For example, the source file of the client application can be described by a method using a static invocation interface, in which a function of the server application is directly called from the client application. FIG. 24 is a diagram for describing a source file of an application according to CORBA. The developer describes initialization of an object request broker (ORB), acquisition of an object reference of a naming service, acquisition of an object reference of the server application, and calling of an operation of the server application, in this order (see (1) to (4)). The source file of the client application shown in FIG. 24 is described in a C language by the developer. However, descriptions according to CORBA are included in the source file. Although not shown, the source file of the server application described by the developer also includes descriptions according to CORBA.

Referring back to FIG. 23, the IDL file created by the developer at (2) is compiled by an IDL compiler on the server application side and on the client application side, so that programs for brokering interaction between the applications are created. Specifically, the IDL file compiled on the server application side becomes a skeleton, and the IDL file compiled on the client application side becomes a stub (see (4)). The generated skeleton is compiled and linked with the source file of the server application described by the developer at (3), so that a server application in an executable format is generated (see (5)). The generated stub is complied and linked with the source file of the client application described by the developer at (3), so that a client application in an executable format is generated (see (6)).

To develop an application according to the specification of CORBA, the developer is required to describe, at (3) in FIG. 23, the source files of the server application and the client application according to CORBA, as shown in FIG. 24. Thus, the developer needs to have knowledge on CORBA, which causes a burden on the developer.

Japanese Patent Application Laid Open No. 2003-157242 discloses a method in which the developer is not required to describe the source files of the server application or the client application according to CORBA. Instead, an interaction adaptor, which is generated from an IDL file indicating interface definition information of the applications, performs processings, makes settings, and converts data types according to the CORBA specific specification. The interaction adaptor accesses a CORBA object, which is obtained by dividing an application by each function, so that interaction is realized between applications.

There are various examples of the interaction adaptor. In an example explained in paragraph 0041 in Japanese Patent Application Laid Open No. 2003-157242, an interaction adaptor is generated for each class of the CORBA objects, corresponding to an interface in IDL, and accesses an arbitrary CORBA object. In another example explained in paragraph 0093 in Japanese Patent Application Laid Open No. 2003-157242, a single, versatile interaction adaptor accesses an arbitrary CORBA object.

In any case, the interaction adaptor needs to identify a CORBA object among plural CORBA objects. Accordingly, a naming service function is used to identify a unique CORBA object. For example, as shown in FIG. 25, an application server, which is a middleware intended to realize interaction between applications, holds an identifier of a CORBA object and object information corresponding to the identifier as the naming service function. The interaction adaptor refers to the naming service function to generate a CORBA proxy, and uses the generated CORBA proxy to access a CORBA object.

However, the interaction adaptor needs to be provided with a unit for referring to the naming service function, in order to uniquely identify each CORBA object. Thus, the structure and the workload of the interaction adaptor become large. Moreover, the processing speed decreases by using the naming service function. Accordingly, in the conventional technology, interaction between applications is executed in an inefficient environment.

One approach is to consider a middleware platform itself as a single CORBA object. FIG. 26 is a diagram for describing a conventional middleware platform. The middleware platform realizes interaction between plural applications described in various programming languages. In the middleware platform, CORBA is absorbed and hidden, and a structure storing binary data is used as an interface between the middleware platform and the applications installed in the middleware platform. Accordingly, the middleware platform provides a unique interface, so that the middleware platform itself serves as one CORBA object.

In this case, a broker program for brokering interaction between applications installed in the middleware platform does not require the naming service function for identifying a CORBA object. Thus, the structure and the workload of the broker program can be made smaller, and processing time can be reduced.

Nevertheless, a developer is required to describe the applications installed in the middleware platform according a specification of the unique interface provided by the middleware platform. Thus, the developer needs to have knowledge on the specification of the unique interface provided by the middleware platform, which causes a burden on the developer.

Thus, there is a need for a technology capable of efficiently developing and operating an environment for realizing interaction between plural applications.

SUMMARY OF THE INVENTION

It is an object of the present invention to at least partially solve the problems in the conventional technology.

An apparatus according to one aspect of the present invention supports development of a broker program that is installed in a middleware platform that realizes an interaction between plural applications described in various programming languages, and brokers the interaction between the applications. The apparatus includes a broker-program generating unit that generates the broker program by using an interface-definition-language file defining interface definition information concerning the applications. The middleware platform absorbs and hides a common object request broker architecture, and the broker program brokers the interaction between the applications with a structure that stores data in a binary format as an interface to the middleware platform.

A method according to another aspect of the present invention is for supporting development of a broker program that is installed in a middleware platform that realizes an interaction between plural applications described in various programming languages, and brokers the interaction between the applications. The method includes generating the broker program by using an interface-definition-language file defining interface definition information concerning the applications. The middleware platform absorbs and hides a common object request broker architecture, and the broker program brokers the interaction between the applications with a structure that stores data in a binary format as an interface to the middleware platform.

A computer-readable recording medium according to still another aspect of the present invention stores a computer program for supporting development of a broker program that is installed in a middleware platform that realizes an interaction between plural applications described in various programming languages, and brokers the interaction between the applications. The computer program causes a computer to execute generating the broker program by using an interface-definition-language file defining interface definition information concerning the applications. The middleware platform absorbs and hides a common object request broker architecture, and the broker program brokers the interaction between the applications with a structure that stores data in a binary format as an interface to the middleware platform.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3 and 4 are diagrams for explaining an IDL-file storing unit shown in FIG. 2;

FIG. 5 is a diagram for explaining an application-information-input-file storing unit shown in FIG. 2;

FIGS. 6 to 11 are diagrams for explaining a C-specific-processing-source-file storing unit shown in FIG. 2;

FIG. 12 is a diagram for explaining an application-call-definition-file storing unit shown in FIG. 2;

FIG. 13 is a diagram for explaining an application-interface-definition-file storing unit shown in FIG. 2;

FIGS. 14 and 15 are diagrams for explaining a Java™Bean-source-file storing unit shown in FIG. 2;

FIGS. 16 to 18 are diagrams for explaining a Java™-structure-source-file storing unit shown in FIG. 2;

FIG. 24 is a diagram for describing a conventional source file of an application according to CORBA;

FIG. 26 is a diagram for describing a conventional middleware platform.

DETAILED DESCRIPTION OF THE PREFERRED EMBODIMENTS

Figure 1:
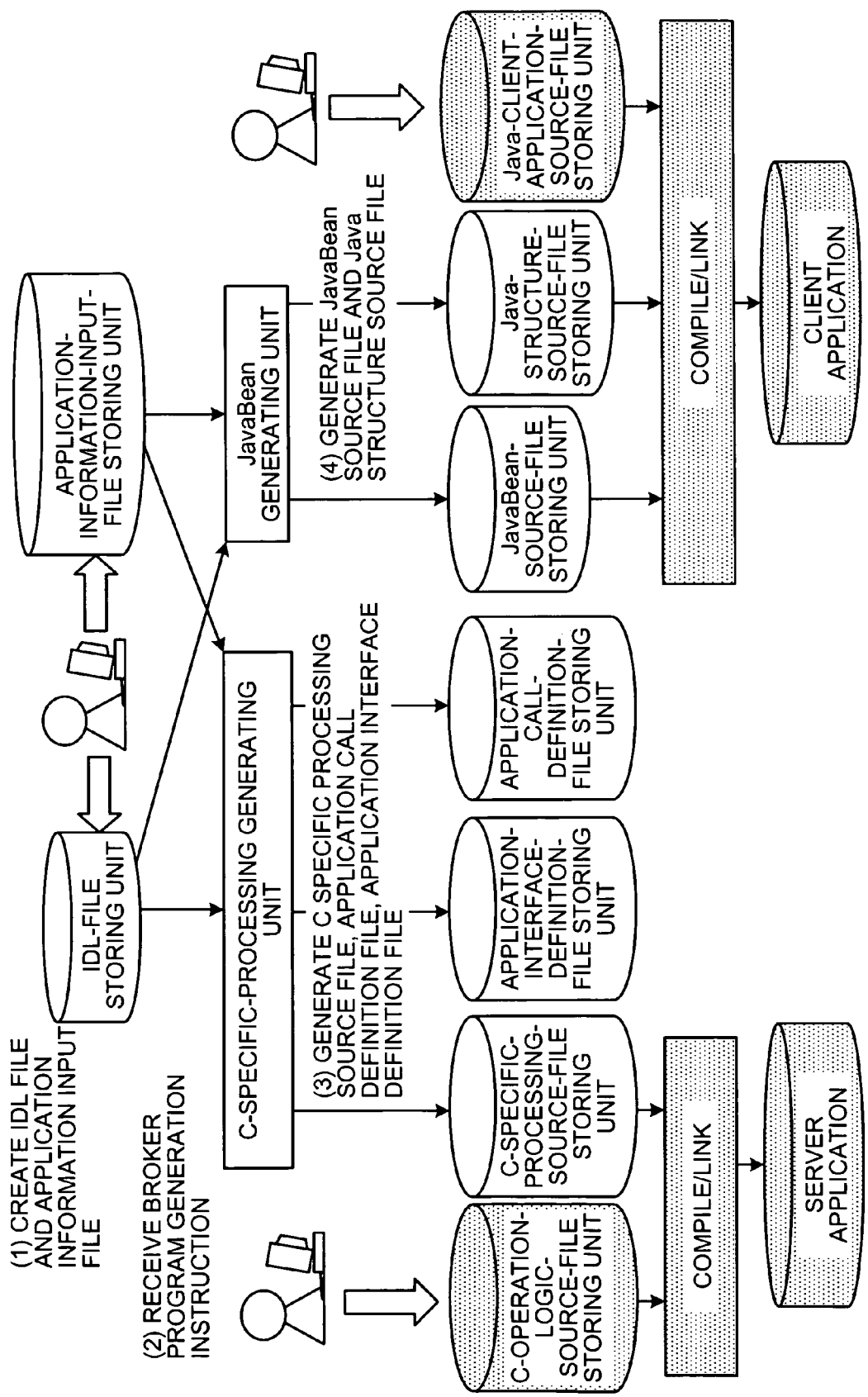
FIG. 1 is a diagram for explaining a broker-program-development supporting apparatus according to a first embodiment of the present invention.

Exemplary embodiments of the present invention will be described in detail below with reference to the accompanying drawings. The present invention is not limited to these embodiments.

A server application is an application software that provides service functions, which is installed and operated in a computer connected to a network. The server application can be, but not limited to, a backbone operation application server for managing a personnel system or a finance system of a company, a data base server that stores a large amount of data for providing information in response to various requests, or a WWW server that is connected to the Internet or an intranet for providing various information. The server applications are programs described in various programming languages, such as the C language and Java™.

A client application is an application software that uses a service function provided by the server application, which is installed and operated in a computer connected to a network. The client application can be, but not limited to, an application software that operates a personnel system or a finance system provided by the backbone operation application server, an application software that sends a request to the data base server to search information stored in the data base server, or an application software that accesses the WWW server to acquire various information. The client applications are programs described in various programming languages.

The C language is a programming language, which is appropriate for structured programming, including a wide variety of operators data types, and control structures. The Java™ is an object-oriented programming language.

A middleware platform is a platform software that realizes interaction between plural applications described in various programming languages, as described with reference to FIG. 26. The middleware platform realizes interaction between, for example, server applications described in C or Java™, and client applications described in C or Java™, or between plural server applications described in C or Java™. The middleware platform executes a unique processing for each programming language of the applications installed, such as opening or closing an execution environment for a common business oriented language (COBOL). Thus, an application installed in the middleware platform can be in any programming language.

CORBA is a specification of the middleware platform, which defines mechanisms for creating server applications and client applications, and mechanisms for operating the applications created.

A broker program is required for brokering interaction between server applications and client applications installed in the middleware platform, as described with reference to FIG. 26. A C specific processing source file is a broker program for brokering interaction between an application described in C and an application described in a programming language other than C. A Java™Bean source file and a Java™ structure source file are broker programs for brokering interaction between an application described in Java™ and an application described in a programming language other than Java™.

FIG. 1 is a diagram for explaining a broker-program-development supporting apparatus according to a first embodiment of the present invention. In the following description, it is assumed that a broker program is developed for brokering interaction between a server application described in C and a client application described in Java™.

The broker-program-development supporting apparatus is installed in a middleware platform that realizes interaction between plural applications described in various programming languages. The broker-program-development supporting apparatus can efficiently develop and operate an environment for realizing interaction between plural applications.

In the broker-program-development supporting apparatus, an IDL file is stored in an IDL-file storing unit (see (1)). The IDL file includes interface definition information, such as a data type definition of a parameter for a server application. The data type definition is described in IDL by a developer of the server application. In the broker-program-development supporting apparatus, an application information input file is stored in an application-information-input-file storing unit (see (1)). The application information input file is described by the developer, and includes information on an application such as a server application name or a library name.

The broker-program-development supporting apparatus receives a broker program generation instruction for operating the broker-program-development supporting apparatus (see (2)). The broker-program-development supporting apparatus generates from the IDL file, a C specific processing source file, which is a broker program, and stores the C specific processing source file in a C-specific-processing-source-file storing unit (see (3)). An object of the broker-program-development supporting apparatus is to realize interaction between a middleware platform and a server application installed in the middleware platform. In the middleware platform, CORBA is absorbed and hidden, and a structure storing binary data is used as an interface between the middleware platform and the server application. To achieve the object, the broker-program-development supporting apparatus analyzes the IDL file in a C-specific-processing generating unit, and generates the C specific processing source file by describing a function for converting a parameter of the server application into a data type of C.

For example, when the IDL file includes a description op, which is an operation name in IDL indicating a function name of the server application, the C-specific-processing generating unit describes a function named apfwskel_op in the C specific processing source file. In an environment for executing interaction between plural applications, when the server application is called from the middleware platform by the function apfwskel_op, binary data stored in a structure in the middleware platform is converted to a data type in C, and is passed to the server application.

The broker-program-development supporting apparatus generates, from the IDL file and the application information input file, application call definition information that is required for calling an application from the middleware platform (see (3)). Specifically, the C-specific-processing generating unit analyzes the IDL file and the application information input file, and describes a definition of a server application name of the server application called by the client application, a definition of a library name of a library including the server application, and a function name of the server application.

For example, when the IDL file includes the description, op, which is the operation name in IDL indicating the function name of the server application, a C-specific-processing generating unit 31 describes <func name="op"/> as the application call definition information. In the environment for executing interaction between plural applications, when the function name of the server application apfwskel_op is designated, binary data stored in a structure in the middleware platform is converted to a data type in C, and the server application is called from the middleware platform by the function name op described in the application call definition information.

When the application information input file includes a server application name apl corresponding to the operation name op, and a library name libserverapl.so of the library including the server application, the C-specific-processing generating unit describes, as the application call definition information, <target name="apl"> and <library name="libserverapl.so"/>. In the environment for executing interaction between plural applications, when the server application name apl is designated, the server application is called from the middleware platform by the function name apfwskel_op, which is included in the library libserverapl.so.

The broker-program-development supporting apparatus generates, from the IDL file and the application information input file, an application interface definition file indicating interface information of the function of the server application. The generated application interface definition file is stored in an application-interface-definition-file storing unit (see (3)). Specifically, the C-specific-processing generating unit analyzes the IDL file and the application information input file, and describes the function name of the server application, a return value of the function, a direction of a parameter, a data type of the parameter, and the parameter name, etc.

For example, when the IDL file includes a description void op(in long indata), the C-specific-processing generating unit describes, as the application interface definition information, <func name="op">, <return type="void"/>, and <param name="indata" type="long" direction="IN"/>. In the environment for executing interaction between plural applications, when the server application is called from the middleware platform by a function, the function name is op, the return value of the function is void, the direction of the parameter is in, the data type of the parameter is long, and the parameter name is indata.

The broker-program-development supporting apparatus generates, from the IDL file, a Java™Bean source file and a Java™ structure source file. The Java™Bean source file and the Java™ structure source file are stored in a Java™Bean-source-file storing unit and a Java™-structure-source-file storing unit, respectively (see (4)).

Specifically, to realize interaction between the middleware platform and the server application installed in the middleware platform, a Java™Bean generating unit analyzes the IDL file, and describes a function for converting a parameter of the server application into a data type in Java™, thereby generating the Java™Bean source file and the Java™ structure source file.

The C specific processing source file is compiled and linked with a C server application source file created by a developer. Thus, a server application is installed in the middleware platform that absorbs and hides CORBA and uses a structure storing binary data as an interface between the middleware platform and applications installed in the middleware platform. Similarly, the Java™Bean source file and the Java™ structure source file are compiled and linked with a Java™ client application source file created by a developer. Thus, a client application is installed in the middleware platform that absorbs and hides CORBA and uses a structure storing binary data as an interface between the middleware platform and applications installed in the middleware platform.

In the broker-program-development supporting apparatus according to the first embodiment of the present invention, a broker program is generated by providing only basic information, such as an IDL file. Thus, burden on a developer is smaller, and interaction between plural applications is realized in a more efficient environment, than in the conventional technology in which the developer needs to have knowledge on a specification of a unique interface provided by a middleware platform. Accordingly, the environment for realizing interaction between plural applications is efficiently developed and operated.

Figure 2:
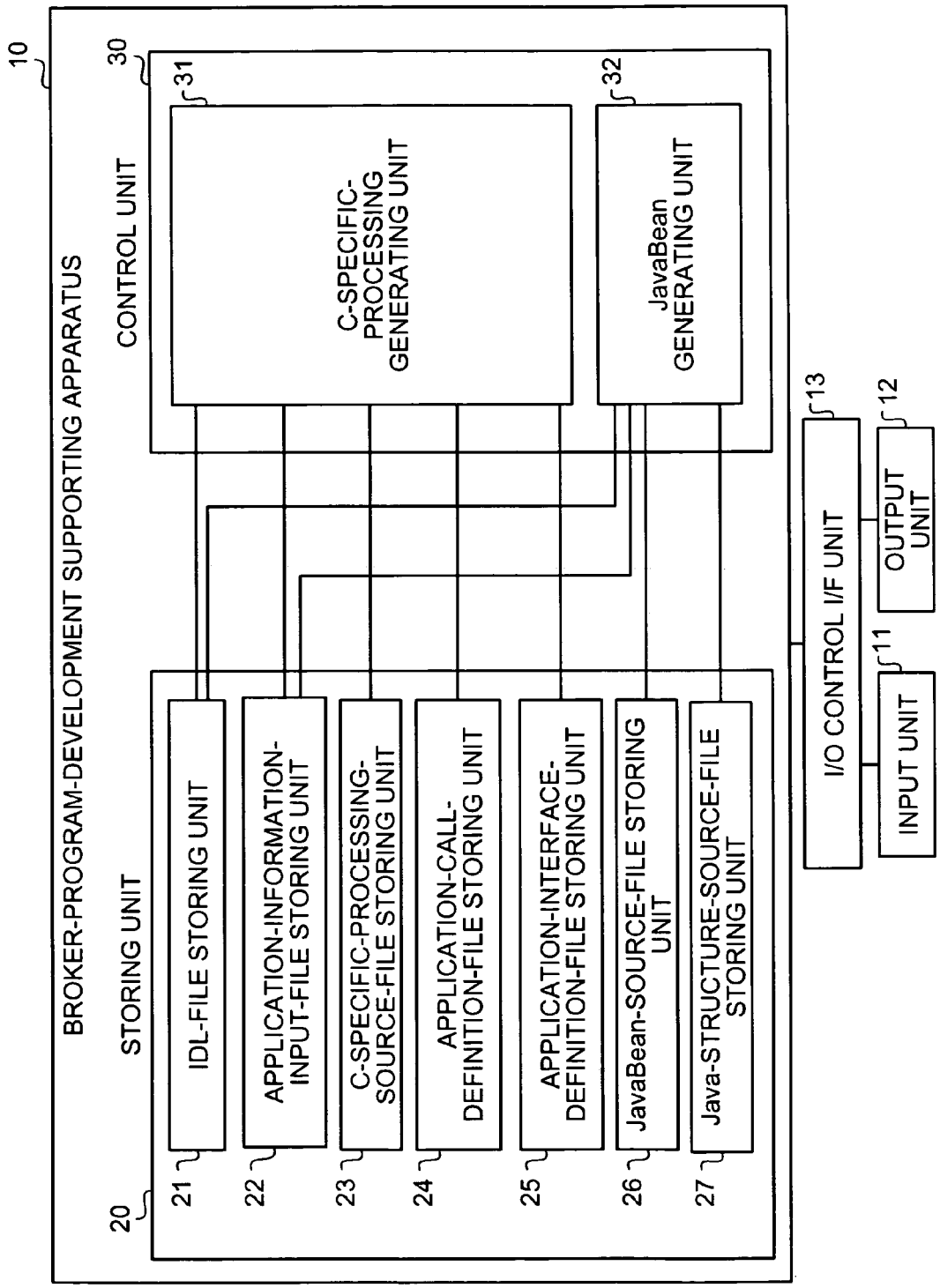
FIG. 2 is a block diagram of the broker-program-development supporting apparatus explained in FIG. 1.
Figure 19:
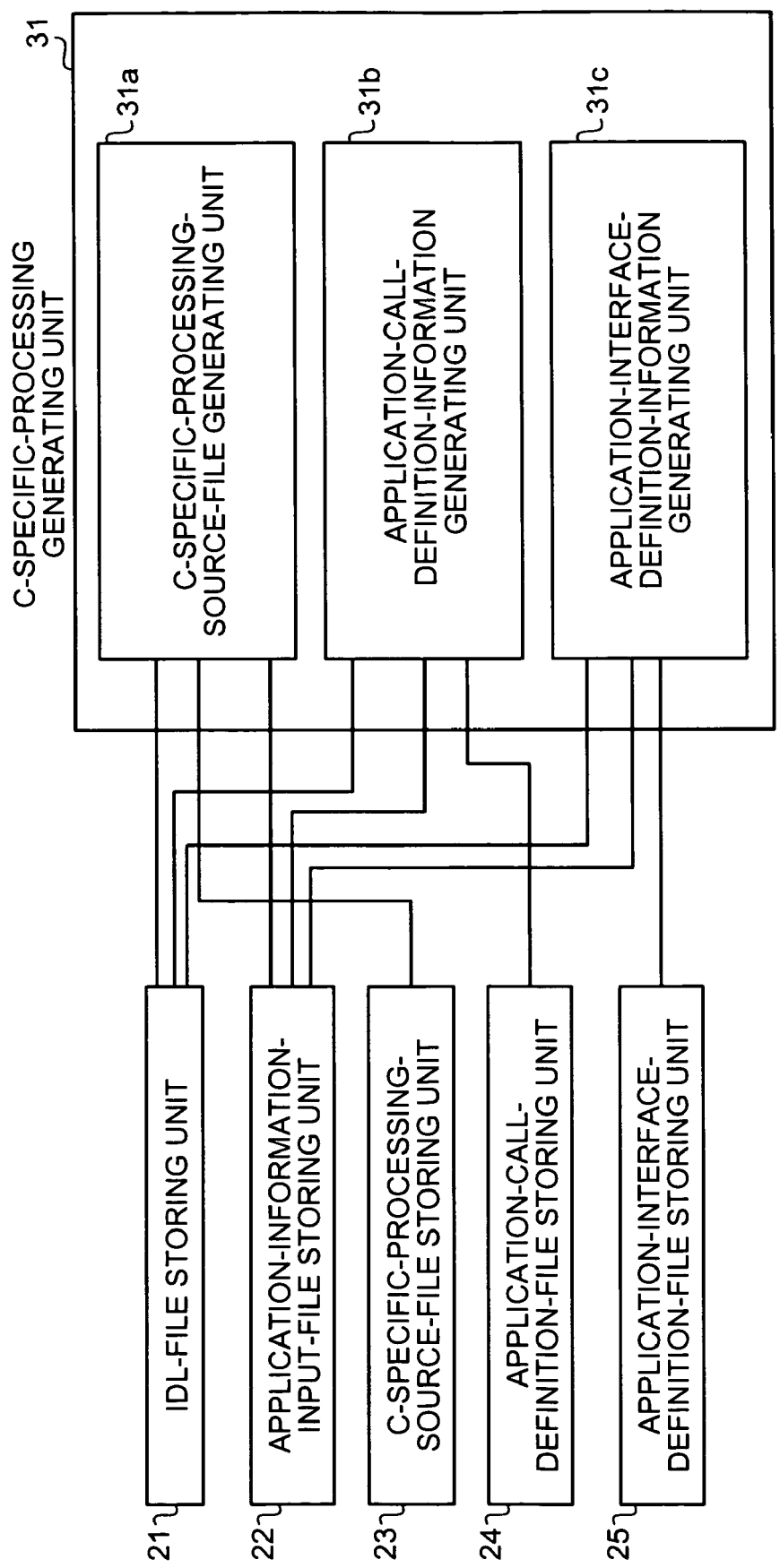
FIG. 19 is a block diagram of a C-specific-processing generating unit shown in FIG. 2.

A broker-program-development supporting apparatus 10 according to the first embodiment is described with reference to FIGS. 2 to 18. FIG. 2 is a block diagram of the broker-program-development supporting apparatus 10. FIGS. 3 and 4 are diagrams for explaining an IDL-file storing unit 21. FIG. 5 is a diagram for explaining an application-information-input-file storing unit 22. FIGS. 6 to 11 are diagrams for explaining a C-specific-processing-source-file storing unit 23. FIG. 12 is a diagram for explaining an application-call-definition-file storing unit 24. FIG. 13 is a diagram for explaining an application-interface-definition-file storing unit 25. FIGS. 14 and 15 are diagrams for explaining a Java™Bean-source-file storing unit 26. FIGS. 16 to 18 are diagrams for explaining a Java™-structure-source-file storing unit 27. FIG. 19 is a block diagram of the C-specific-processing generating unit 31.

As shown in FIG. 2, the broker-program-development supporting apparatus 10 includes an input unit 11, an output unit 12, an input output (I/O) control interface (I/F) unit 13, a storing unit 20, and a control unit 30.

The input unit 11 receives information such as data used for processings performed by the control unit 30 and operation instructions for the processings. The information can be input with a keyboard, or from a storage medium, or by communication, etc. Specifically, the information can be an IDL file, an application information input file, and operation instructions such as a broker program generation instruction. The IDL file is interface definition information expressed in IDL by a developer, such as a data type of a parameter of an application. The application information input file is information on an application described by a developer, such as a server application name and a library name. The IDL file is stored in the IDL-file storing unit 21, and the application information input file is stored in the application-information-input-file storing unit 22.

The output unit 12 outputs results of processings performed by the control unit 30 and operation instructions for performing various processings to a monitor, a printer or a speaker. For example, the output unit 12 outputs log information indicating a process of a processing, various operation instructions input from the input unit 11, or a list of generated files.

The I/O control I/F unit 13 controls data transfer among the input unit 11, the output unit 12, the storing unit 20, and the control unit 30.

The storing unit 20 stores data used for processings performed by the control unit 30. The storing unit 20 includes the IDL-file storing unit 21, the application-information-input-file storing unit 22, the C-specific-processing-source-file storing unit 23, the application-call-definition-file storing unit 24, the application-interface-definition-file storing unit 25, the Java™Bean-source-file storing unit 26, and the Java™-structure-source-file storing unit 27.

The IDL-file storing unit 21 stores an IDL file input from the input unit 11, which is information required by the broker-program-development supporting apparatus 10 to generate a broker program. The IDL file includes interface definition information of an application, which is described in IDL by a developer of the application. For example, as shown in FIG. 3, interface apfw_inf describes in IDL that an interface name of a server application is apfw_inf. Further, void op(in long indata) describes in IDL that a function name of a server application is op, a return value of the function is void, a direction of a parameter is in, a data type of the parameter is long, and the parameter name is indata.

In another example shown in FIG. 4, information is described in IDL that an interface name of a server application is apfwinf, a function name of a server application is sampleop1, a return value of the function is void, a direction of a parameter having a parameter name of indata is in, a data type of the parameter indata is sample_struct1, a direction of a parameter having a parameter name of outdata is out, and a data type of the parameter outdata is sample_struct1.

The application-information-input-file storing unit 22 stores an application information input file, which is information on an application described by a developer, and input from the input unit 11. The information is required by the broker-program-development supporting apparatus 10 to generate a broker program. In an example shown in FIG. 5, a description <target name="apl"/> describes that a server application name is apl, and a description <library name="libserverapl.so"/> describes that a name of a library including the server application is libserverapl.so. In FIG. 5, the language for describing the application information input file is an extensible markup language (XML); however, any other language that describes a document can be employed, such as a standard generalized mark-up language (SGML).

The C-specific-processing-source-file storing unit 23 stores a C specific processing source file generated by the C-specific-processing generating unit 31. As shown in FIGS. 6 to 11, the C-specific-processing-source-file storing unit 23 stores a source file of a broker program described in C. For example, a description apfwskel_sampleop1 is a function name of a server application. In the environment for executing interaction between plural applications, when the server application is called from the middleware platform by the function apfwskel_sampleop1, binary data stored in a structure in the middleware platform is converted to a data type in C, and is passed to the server application. The C specific processing source file is compiled and linked with a C server application source file created by a developer. Thus, a server application is installed in the middleware platform.

The application-call-definition-file storing unit 24 stores application call definition information generated by the C-specific-processing generating unit 31 as an application call definition file. The application call definition information is required for calling an application from the middleware platform. As shown in FIG. 12, a description <target name="apl"> describes that a server application name is apl, a description <library name="libserverapl.so"/> describes that a name of a library including the server application is libserverapl.so, and a description <func name="op"/> describes that a function name of the server application is op. In FIG. 12, the language for describing the application information input file is XML; however, any other language that describes a document can be employed, such as SGML.

The application-interface-definition-file storing unit 25 stores application interface definition information generated by the C-specific-processing generating unit 31 as an application interface definition file. The application interface definition information indicates interface information of a function of an application. As shown in FIG. 13, a description <func name="op"> describes that a function name of a server application is op, a description <return type="void"/> describes that a return value of the function is void, a description <param name="indata" type="long" direction="IN"/> describes that a parameter name of the server application is indata, a data type of the parameter is long, and a direction of the parameter is in. In FIG. 13, the language for describing the application information input file is XML; however, any other language that describes a document can be employed, such as SGML.

The Java™Bean-source-file storing unit 26 stores a Java™Bean source file generated by a Java™Bean generating unit 32. The Java™Bean source file is a source file of a broker program described in Java™. As shown in FIGS. 14 and 15, a description public class sampleop1Bean indicates that a class is defined by a unit configuring a source file in Java™. The Java™Bean source file is compiled and linked with a Java™ client application source file created by a developer. Thus, a client application is installed in the middleware platform.

The Java™-structure-source-file storing unit 27 stores a Java™ structure source file generated by the Java™Bean generating unit 32. The Java™ structure source file is a source file of a broker program described in Java™. As shown in FIGS. 16 to 18, a description final public class sample_str1 indicates that a class is defined, and a description public Java.lang.String sample_picx; defines a parameter having a parameter name of sample_picx, a data type of which is a string type. The Java™ structure source file is compiled and linked with a Java™ client application source file created by a developer. Thus, a client application is installed in the middleware platform.

The control unit 30 controls the broker-program-development supporting apparatus 10 and executes various processings. The control unit 30 includes the C-specific-processing generating unit 31 and the Java™Bean generating unit 32.

The C-specific-processing generating unit 31 generates a C specific processing source file, an application call definition file, and an application interface definition file, from an IDL stored in the IDL-file storing unit 21 and an application information input file stored in the application-information-input-file storing unit 22. The C specific processing source file, the application call definition file, and the application interface definition file generated are stored in the C-specific-processing-source-file storing unit 23, the application-call-definition-file storing unit 24, and the application-interface-definition-file storing unit 25, respectively.

As shown in FIG. 19, the C-specific-processing generating unit 31 includes a C-specific-processing-source-file generating unit 31a, an application-call-definition-information generating unit 31b, and an application-interface-definition-information generating unit 31c.

The C-specific-processing-source-file generating unit 31a generates a broker program from an IDL file indicating interface definition information of an application, for brokering interaction between applications in the middleware platform. The broker program is installed in a middleware platform that absorbs and hides CORBA and uses a structure storing binary data as an interface between the middleware platform and applications installed in the middleware platform. To realize interaction between the middleware platform and a server application, the C-specific-processing-source-file generating unit 31a generates a C specific processing source file, which is a broker program, by analyzing the IDL file and describing a function for converting a parameter of the server application to a data type of C.

For example, when an IDL file includes an IDL operation name sampleop1, which indicates a function name of a server application, as shown in FIG. 4, the C-specific-processing-source-file generating unit 31a describes a function named apfwskel_sampleop1 in a C specific processing source file, as shown in FIG. 6. In an environment for executing interaction between plural applications, when the server application is called from the middleware platform by the function apfwskel_sampleop1, binary data stored in a structure in the middleware platform is converted to a data type in C, and is passed to the server application.

The application-call-definition-information generating unit 31b generates application call definition information required for calling an application from the middleware platform. Specifically, the application-call-definition-information generating unit 31b analyzes an IDL file and an application information input file, and describes a definition of a server application name of the server application called by a client application, a definition of a library name of a library including the server application, and a function name of the server application, etc.

For example, when an IDL file includes an IDL operation name op, which indicates a function name of a server application, as shown in FIG. 3, the application-call-definition-information generating unit 31b describes <func name="op"/> as application call definition information, as shown in FIG. 12. In an environment for executing interaction between plural applications, the function name apfwskel_op of the server application is designated, binary data stored in a structure in the middleware platform is converted to a data type in C, and the application server is called from the middleware platform by the function name op described in the application call definition information.

When an application information input file includes a server application name apl corresponding to the operation name op, and a library name of a library including the server application is libserverapl.so, as shown in FIG. 5, the application-call-definition-information generating unit 31b describes <target name="apl"> and <library name="libserverapl.so"/> as the application call definition information, as shown in FIG. 12. In an environment for executing interaction between plural applications, and the server application name apl is designated, the server application is called from the middleware platform by the function name apfwskel_op, which is included in the library libserverapl.so.

The application-interface-definition-information generating unit 31c generates application interface definition information indicating interface definition information of a function of an application. Specifically, the application-interface-definition-information generating unit 31c analyzes an IDL file and an application information input file, and describes a function name of the server application, a return value of the function, a direction of a parameter, a data type of the parameter, and a parameter name, etc.

When an IDL file includes a description void op(in long indata) as shown in FIG. 3, the application-interface-definition-information generating unit 31c describes <func name="op">, <return type="void"/>, and <param name="indata"type="long"direction="IN"/> as application interface definition information, as shown in FIG. 13. In an environment for executing interaction between plural applications, when the server application is called from the middleware platform by a function, a function name is op, a return value of the function is void, a direction of a parameter is in, a data type of the parameter is long, and the parameter name is indata.

Referring back to FIG. 2, the Java™Bean generating unit 32 generates a Java™Bean source file and a Java™ structure source file. Specifically, the Java™Bean generating unit 32 generates a Java™Bean source file and a Java™ structure source file from an IDL file stored in the IDL-file storing unit 21 and an application information input file stored in the application-information-input-file storing unit 22, and stores the Java™Bean source file and the Java™ structure source file in the Java™Bean-source-file storing unit 26 and the Java™-structure-source-file storing unit 27, respectively.

The Java™Bean source file and the Java™ structure source file are installed in a middleware platform that absorbs and hides CORBA and uses a structure storing binary data as an interface between the middleware platform and applications installed in the middleware platform. To realize interaction between the middleware platform and the server application, the Java™Bean generating unit 32 analyzes the IDL file, and describes a function for converting a parameter of the server application into a data type in Java™, thereby generating the Java™Bean source file and the Java™ structure source file. When the IDL file includes an IDL operation name sampleop1 indicating a function name of the server application, as shown in FIG. 4, the Java™Bean generating unit 32 defines a class in the Java™Bean source file, public class sampleop1Bean, as shown in FIG. 14. In an environment for executing interaction between plural applications, when the server application is called from the middleware platform by the function sampleop1, binary data stored in a structure in the middleware platform is converted to a data type in Java™, and is passed to the server application.

Figure 20:
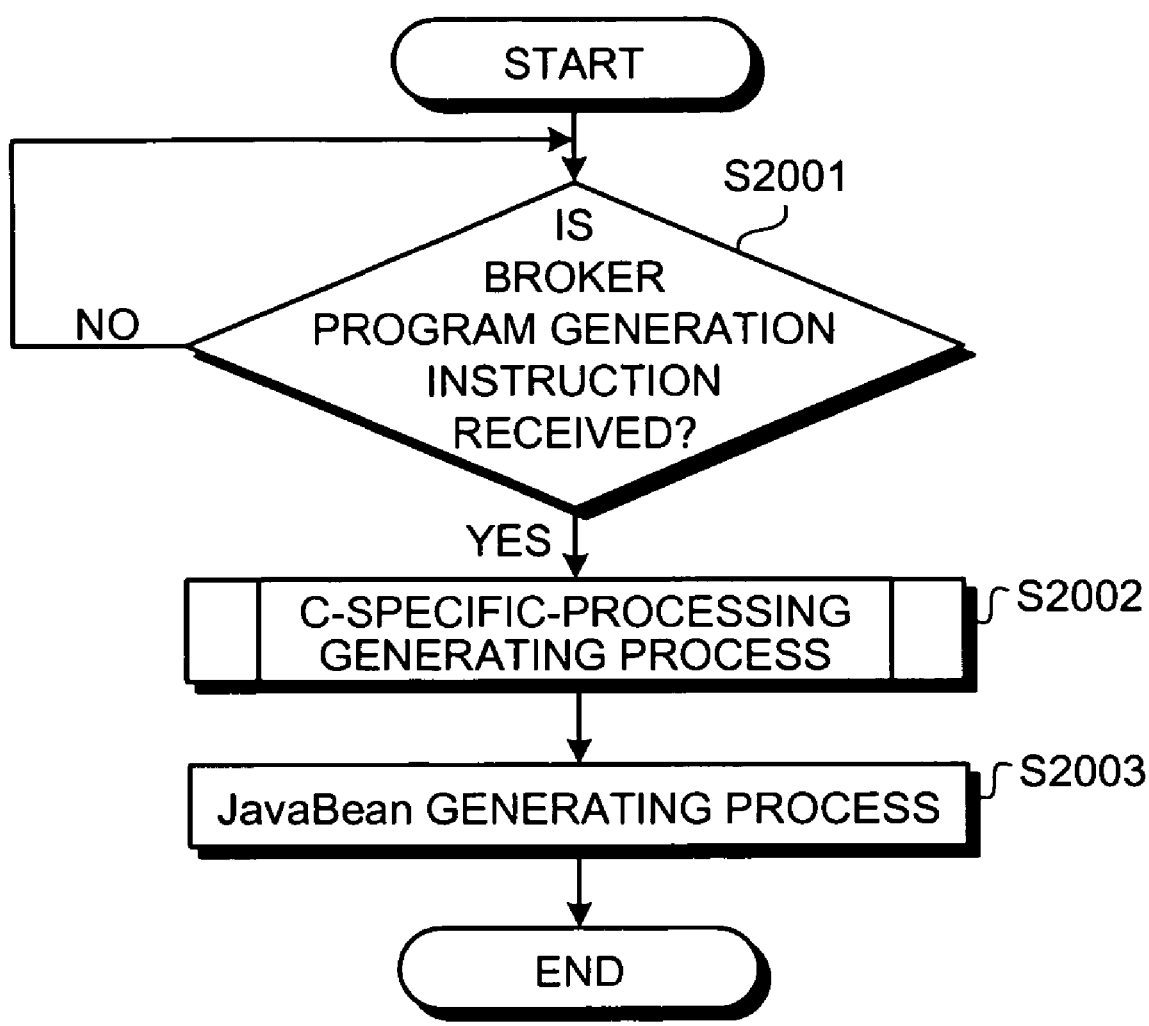
FIG. 20 is a flowchart of a processing performed by the broker-program-development supporting apparatus shown in FIG. 2.

FIG. 20 is a flowchart of a processing performed by the broker-program-development supporting apparatus 10.

When the broker-program-development supporting apparatus 10 receives a broker program generation instruction for operating the broker-program-development supporting apparatus 10 through the input unit 11 (Yes at step S2001), the C-specific-processing generating unit 31 generates a C specific processing source file, an application call definition file, and an application interface definition file from an IDL file stored in the IDL-file storing unit 21 and an application information input file stored in the application-information-input-file storing unit 22. The C-specific-processing generating unit 31 stores the C specific processing source file in the C-specific-processing-source-file storing unit 23, the application call definition file in the application-call-definition-file storing unit 24, and the application interface definition file in the application-interface-definition-file storing unit 25, respectively (step S2002).

The Java™Bean generating unit 32 generates a Java™Bean source file and a Java™ structure source file from the IDL file stored in the IDL-file storing unit 21 and the application information input file stored in the application-information-input-file storing unit 22. The Java™Bean generating unit 32 stores the Java™Bean source file in the Java™Bean-source-file storing unit 26 and the Java™ structure source file in the Java™-structure-source-file storing unit 27, respectively (step S2003).

Figure 21:
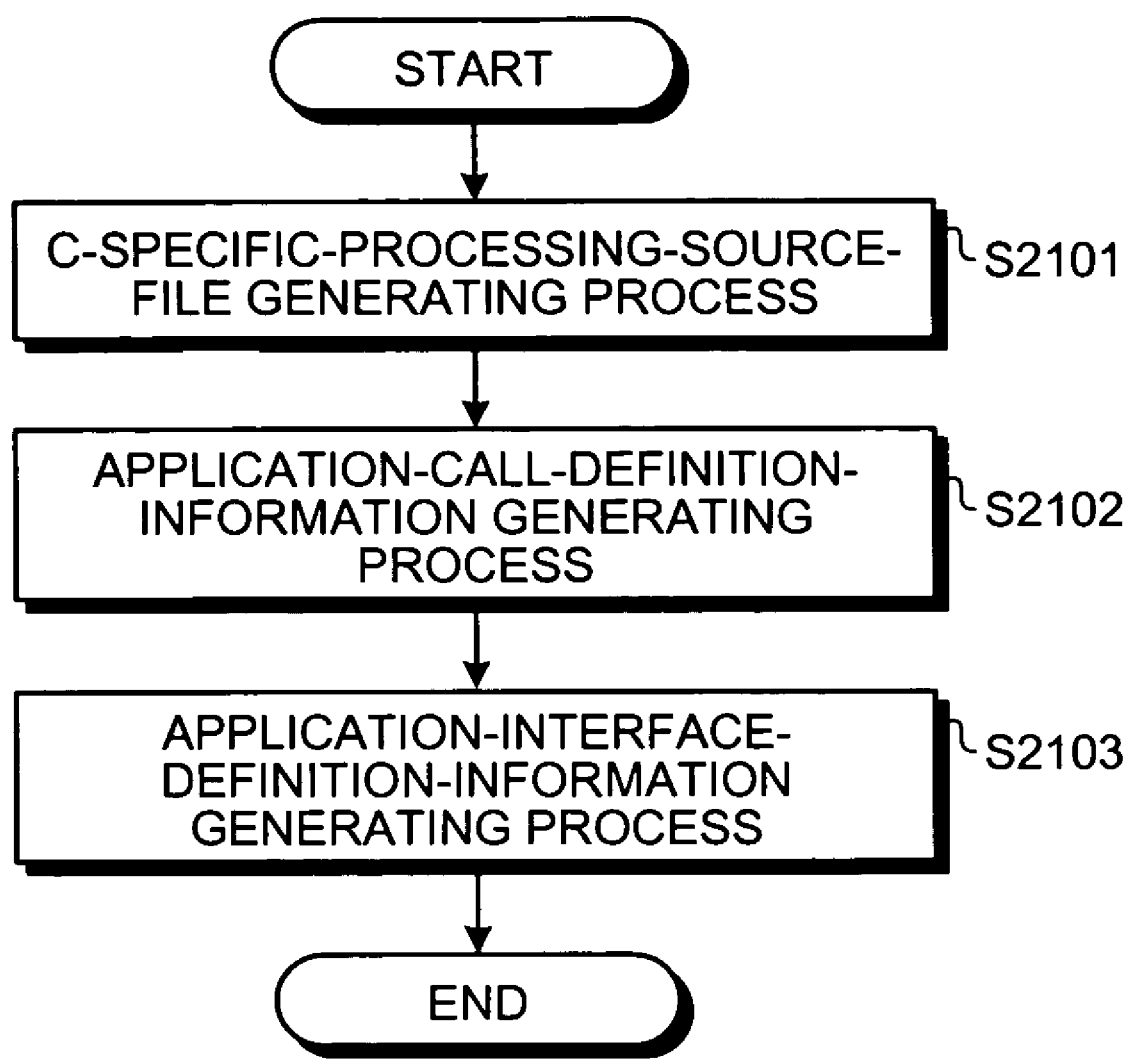
FIG. 21 is a detailed flowchart of a C-specific-processing generating process mentioned in FIG. 20.

FIG. 21 is a detailed flowchart of the C-specific-processing generating process performed at step S2002 in FIG. 20. The C-specific-processing-source-file generating unit 31a analyzes the IDL file stored in the IDL-file storing unit 21, and describes a function for converting a parameter of a server application to a data type in C to generate the C specific processing source file, and stores the C specific processing source file in the C-specific-processing-source-file storing unit 23 (step S2101).

The application-call-definition-information generating unit 31b analyzes the IDL file stored in the IDL-file storing unit 21 and the application information input file stored in the application-information-input-file storing unit 22, describes a definition of a server application name of the server application called by a client application, a definition of a library name of a library including the server application, and a function name of the server application, etc., to generate the application call definition information, and stores the application call definition information as the application call definition file in the application-call-definition-file storing unit 24 (step S2102).

The application-interface-definition-information generating unit 31c analyzes the IDL file stored in the IDL-file storing unit 21 and the application information input file stored in the application-information-input-file storing unit 22, describes the function name of the server application, a return value of the function, a direction of a parameter, a data type of the parameter, and the parameter name, etc., to generate application interface definition information, and stores the application interface definition information as the application interface definition file in the application-interface-definition-file storing unit 25 (step S2103).

The broker-program-development supporting apparatus 10 generates the C specific processing source file, the application interface definition file, the application call definition file, the Java™Bean source file, and the Java™ structure source file from the IDL file and the application information input file. However, the broker-program-development supporting apparatus 10 can selectively generate, for example, only the C specific processing source file or only the application call definition file, and selectively receive a file to be input to the broker-program-development supporting apparatus 10 in accordance with the file to be generated.

According to the first embodiment, a broker program that mediates interaction between applications is generated from an IDL file indicating interface definition information of the applications. The broker program and the applications are installed in a middleware platform in which CORBA is absorbed and hidden, and a structure storing binary data is used as an interface between the middleware platform and the applications. The broker program is generated by providing only basic information, such as an IDL file. Thus, burden on a developer is smaller, and interaction between plural applications is realized in a more efficient environment, than in the conventional technology in which the developer needs to have knowledge on a specification of a unique interface provided by the middleware platform. Accordingly, the environment for realizing interaction between plural applications is efficiently developed and operated.

According to the first embodiment, application call definition information required for calling an application from a middleware platform is generated, and application interface definition information indicating interface definition information of a function of an application is generated. Thus, when a plurality of applications is installed in the middleware platform, a target application and a function of the application is appropriately selected and executed. Accordingly, an environment for realizing interaction between plural applications can be created reliably.

A second embodiment according to the present invention is described as follows. In the first embodiment, the server application is described in C, and the client application is described in Java™. However, the applications can be described in other programming languages. For example, the server application can be described in COBOL, when the client application is described in Java™. In another example, the server application can be described in Java™, when the client application is described C.

In the first embodiment, interaction between the server application and the client application is realized. However, interaction between plural server applications, or interaction between plural applications of different processing systems, such as an asynchronous system, can be realized.

Figure 22:
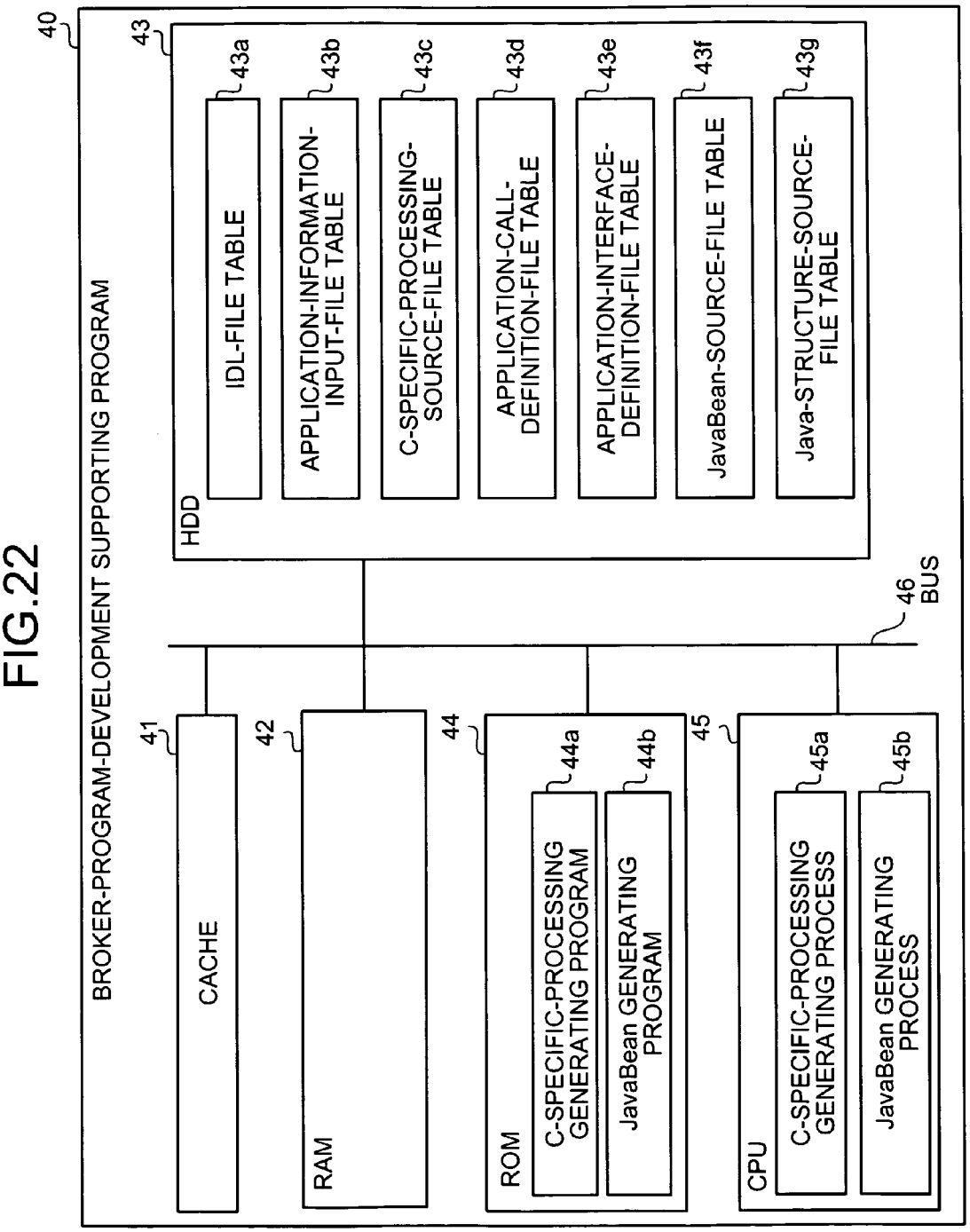
FIG. 22 is a block diagram of a broker-program-development supporting program (computer) according to a second embodiment of the present invention.
Figure 23:
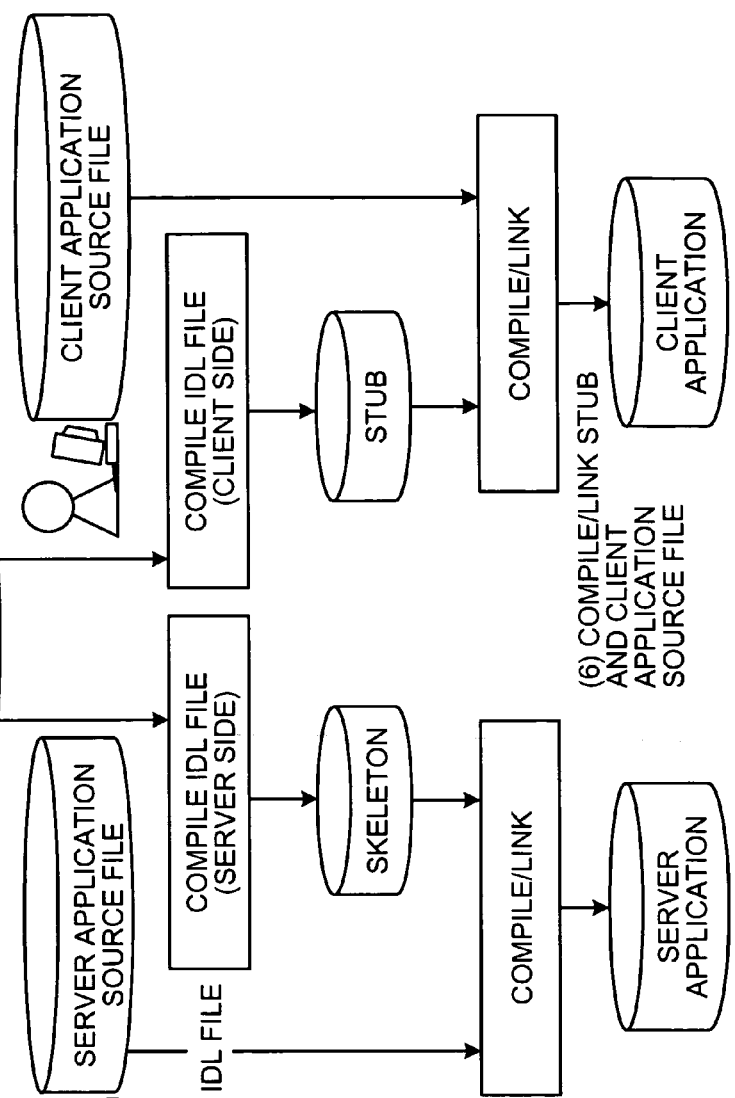
FIG. 23 is a diagram for describing a conventional method of developing applications according to CORBA.
Figure 25:
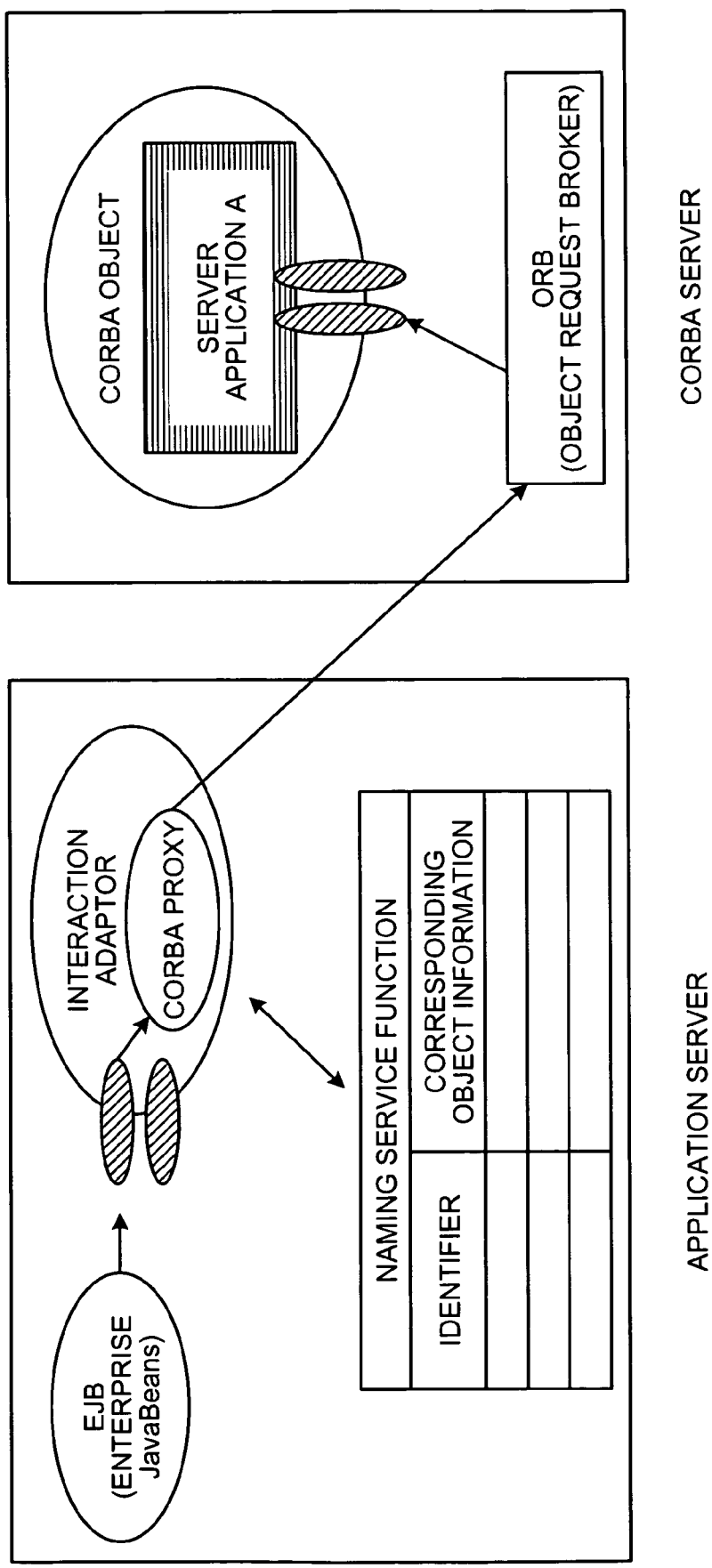
FIG. 25 is a diagram for describing a conventional arrangement of an application server and a CORBA server.

The processings performed in the first embodiment can be implemented on a computer system such as a personal computer or a work station by executing a computer program. FIG. 22 is a block diagram of a broker-program-development supporting program (computer) 40 according to the second embodiment. The broker-program-development supporting program (computer) 40 has the same functions as the first embodiment. Overlapping descriptions are omitted.

The broker-program-development supporting program (computer) 40 includes a cache 41, a random access memory (RAM) 42, a hard disk drive (HDD) 43, a read-only memory (ROM) 44, a central processing unit (CPU) 45, and a bus 46 for connecting these units. The ROM 44 stores a C-specific-processing generating program 44a and a Java™Bean generating program 44b, which function as the broker-program-development supporting apparatus 10 according to the first embodiment.

The CPU 45 reads and executes the programs in the ROM 44. Specifically, the C-specific-processing generating program 44a and the Java™Bean generating program 44b become a C-specific-processing generating process 45a and a Java™Bean generating process 45b. The C-specific-processing generating process 45a and the Java™Bean generating process 45b correspond to the C-specific-processing generating unit 31 and the Java™Bean generating unit 32, respectively.

The HDD 43 includes an IDL-file table 43a, an application-information-input-file table 43b, a C-specific-processing-source-file table 43c, an application-call-definition-file table 43d, an application-interface-definition-file table 43e, a Java™Bean-source-file table 43f, and a Java T-structure-source-file table 43g. The IDL-file table 43a, the application-information-input-file table 43b, the C-specific-processing-source-file table 43c, the application-call-definition-file table 43d, the application-interface-definition-file table 43e, the Java™Bean-source-file table 43f, and the Java™-structure-source-file table 43g correspond to the IDL-file storing unit 21, the application-information-input-file storing unit 22, the C-specific-processing-source-file storing unit 23, the application-call-definition-file storing unit 24, the application-interface-definition-file storing unit 25, the Java™Bean-source-file storing unit 26, and the Java™-structure-source-file storing unit 27, respectively.

The C-specific-processing generating program 44a and the Java™Bean generating program 44b do not necessarily have to be stored in the ROM 44. The programs can be stored in transportable storage media inserted in the broker-program-development supporting program (computer) 40 such as a flexible disk (FD), a compact disc read only memory (CD-ROM), a magneto-optical (MO) disk, a digital versatile disk (DVD), and an integrated circuit (IC) card. The programs can be stored in fixed storage media, installed in or externally attached to the broker-program-development supporting program (computer) 40, such as a HDD. The programs can be stored in communication media such as a database in another computer system or server connected to the broker-program-development supporting program (computer) 40 through a public line, the Internet, a local area network (LAN), a wide area network (WAN), and so forth.

All the automatic processes explained in the present embodiment can be, entirely or in part, carried out manually. Similarly, all the manual processes explained in the present embodiment can be entirely or in part carried out automatically by a known method. The sequence of processes, the sequence of controls, specific names, and data including various parameters can be changed as required unless otherwise specified.

The constituent elements of the devices illustrated are merely conceptual and may not necessarily physically resemble the structures shown in the drawings. For instance, the devices need not necessarily have the structure that is illustrated. The devices as a whole or in parts can be broken down or integrated either functionally or physically in accordance with the load or how the devices are to be used. The process functions performed by the apparatus are entirely or partially realized by the CPU 45 or a program executed by the CPU 45 or by a hardware using wired logic.

According to an embodiment of the present invention, a broker program is generated by providing only basic information, such as an IDL file, so that burden on a developer is smaller, and interaction between plural applications is realized in a more efficient environment, than in the conventional technology in which the developer needs to have knowledge on a specification of a unique interface provided by the middleware platform. Accordingly, the environment for realizing interaction between plural applications is efficiently developed and operated.

Furthermore, according to an embodiment of the present invention, when a plurality of applications is installed in the middleware platform, a target application and a function of the application is appropriately selected and executed. Accordingly, an environment for realizing interaction between plural applications can be created reliably.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
 a processor; and
 a memory storing computer-readable instructions, execution of the instructions by the processor facilitates supporting development of a broker program that is installed in a middleware platform that realizes an interaction between plural applications described in various programming languages, the broker program brokering the interaction between the applications, execution of the instructions by the processor configuring the apparatus to include:

a first broker-program generating unit to generate a broker program for an application described in C by using an interface-definition-language file and to generate application call definition information and application interface definition information by using the interface-definition-language file and an application information input file, the application call definition information describing call definition information for calling the application described in C from the middleware platform, the application interface definition information describing interface definition information that includes a function concerning the application described in C, the application information input file describing application information that includes name information on the application described in C, a second broker-program generating unit to generate broker programs for an application described in JAVA by using the interface-definition-language file, the broker programs being a JAVA Bean source file that describes definitions of JAVA Bean and a JAVA structure source file that describes definitions of structure in JAVA, a first application generating unit to generate the application described in C by compiling and linking the broker program for the application described in C and an application source file described in C, and a second application generating unit to generate the application described in JAVA by compiling and linking the broker programs for the application described in JAVA and an application source file described in JAVA, wherein the middleware platform absorbs and hides a common object request broker architecture, and the broker programs for the application described in C and the application described in JAVA broker the interaction between the applications with a structure as an interface to the middleware platform.

2. A method of supporting development of a broker program that is installed in a middleware platform that realizes an interaction between plural applications described in various programming languages, the broker program brokering the interaction between the applications, the method comprising:

generating, using a processor, a broker program for an application described in C by using an interface-definition-language file and generating application call definition information and application interface definition information by using the interface-definition-language file and an application information input file, the application call definition information describing call definition information for calling the application described in C from the middleware platform, the application interface definition information describing interface definition information that includes a function concerning the application described in C, the application information input file describing application information that includes name information on the application described in C, generating, using a processor, broker programs for an application described in JAVA by using the interface-definition-language file, the broker programs being a JAVA Bean source file that describes definitions of JAVA Bean and a JAVA structure source file that describes definitions of structure in JAVA, generating, using a processor, the application described in C by compiling and linking the broker program for the application described in C and an application source file described in C, and generating, using a processor, the application described in JAVA by compiling and linking the broker programs for the application described in JAVA and an application source file described in JAVA, wherein the middleware platform absorbs and hides a common object request broker architecture, and the broker programs for the application described in C and the application described in JAVA broker the interaction between the applications with a structure as an interface to the middleware platform.

3. A computer-readable, non-transitory medium storing a computer program for supporting development of a broker program that is installed in a middleware platform that realizes an interaction between plural applications described in various programming languages, the broker program brokering the interaction between the applications, wherein the computer program causes a computer to execute:

generating, using a processor, a broker program for an application described in C by using an interface-definition-language file and generating application call definition information and application interface definition information by using the interface-definition-language file and an application information input file, the application call definition information describing call definition information for calling the application described in C from the middleware platform, the application interface definition information describing interface definition information that includes a function concerning the application described in C, the application information input file describing application information that includes name information on the application described in C, generating broker programs for an application described in JAVA by using the interface-definition-language file, the broker programs being a JAVA Bean source file that describes definitions of JAVA Bean and a JAVA structure source file that describes definitions of structure in JAVA, generating the application described in C by compiling and linking the broker program for the application described in C and an application source file described in C, and generating the application described in JAVA by compiling and linking the broker programs for the application described in JAVA and an application source file described in JAVA, where in the middleware platform absorbs and hides a common object request broker architecture, and the broker programs for the application described in C and the application described in JAVA broker the interaction between the applications with a structure as an interface to the middleware platform.

* * * * *